(12) United States Patent
Huhn

(10) Patent No.: US 6,767,381 B2
(45) Date of Patent: Jul. 27, 2004

(54) METHOD OF PRODUCING COMPOST TEA AND APPARATUS THEREFOR

(76) Inventor: Theodore C. Huhn, 2819 Blue Ball Rd., Elkton, MD (US) 21921

(*) Notice: Subject to any disclaimer, the term of this patent is extended or adjusted under 35 U.S.C. 154(b) by 55 days.

(21) Appl. No.: 10/033,132

(22) Filed: Dec. 27, 2001

(65) Prior Publication Data

US 2002/0108498 A1 Aug. 15, 2002

Related U.S. Application Data

(60) Provisional application No. 60/259,236, filed on Jan. 2, 2001.

(51) Int. Cl.$^7$ .................................................. C05F 3/00
(52) U.S. Cl. .................... 71/11; 71/12; 71/13; 71/23; 71/24; 435/290.1; 435/818
(58) Field of Search ............................... 71/11–13, 23, 71/24; 435/290.1, 290.2, 290.4, 818

(56) References Cited

U.S. PATENT DOCUMENTS

| | | | | |
|---|---|---|---|---|
| 5,583,045 A | * | 12/1996 | Finn | 435/290.1 |
| 6,352,855 B1 | * | 3/2002 | Kerouac | 435/290.3 |
| 2002/0164781 A1 | * | 11/2002 | Alms et al. | 435/290.1 |

OTHER PUBLICATIONS

Ingham, E.R., "The Compost Teas Brewing Manual", Unisun Communications, LLC, Nov. 2000.*

* cited by examiner

Primary Examiner—David A. Redding

(57) ABSTRACT

Method of producing compost tea by passing an aqueous solution over and through a basket containing compost. This flow leaches and washes microorganisms and nutrients from compost and other organisms and nutrient-rich materials from the basket into the culture tank. The culture tank collects and cultures microorganisms and nutrients, creating compost tea. Compressed air is used to provide circulation instead of mechanical pumps, which can injure the organisms as they pass through.

5 Claims, 1 Drawing Sheet

METHOD OF PRODUCING COMPOST TEA AND APPARATUS THEREFOR

CROSS-REFERENCE TO RELATE APPLICATIONS

This application is based on, and claims the benefit of, Provisional application No. 60/259,236, filed Jan. 2, 2001.

BACKGROUND OF THE INVENTION

1. Field of the Invention

This invention relates to the use of compost tea. Compost tea is a solution used to condition soil for healthy growth of plants. Compost tea has been recognized as a product that can reduce or eliminate the use of pesticides and synthetic fertilizers. The positive values of compost tea have been established through University studies and practical experience.

2. Description of Related Art

Compost tea has typically been prepared by brewing compost in water. A variety of apparatus and techniques are disclosed in the "Compost Tea Brewing Manual."

Other teachings pertinent to compost tea are found in Finn, U.S. Pat. No. 5,583,045, which relates to a compost curing and odor control system; Kerouac, U.S. Pat. No. 6,352,855, which describes an in-vessel composting process and apparatus; and Alms et al. U.S. Pat. Publication 2002/0164781. Alms et al. discloses a compost tea system including a perforate compost basket and at least one bubble generator. However, a continuing need exists for improved means for the production of compost tea that minimizes damage to the microorganisms in the tea.

SUMMARY OF THE INVENTION

The instant invention provides a method and apparatus for the efficient production of compost tea from organic matter.

Specifically, the present invention provides an apparatus for producing compost tea comprising:

a tank of aqueous solution;

an extraction basket positioned over the tank so permit flow-through from the basket into the tunk;

a fluid conduit having a first end submerged at the bottom end of the tank, and a second end positioned over the extraction basket, and a compressed air supply operatively connected to the bottom portion of the conduit to force the aqueous solution up through the conduit.

The instant invention further provides a method for producing compost tea comprising:

placing compost in an extraction basket;

positioning the extraction basket over a tank to permit flow-through from the basket into the tank;

introducing an aqueous solution into the tank;

positioning a fluid conduit having first and second ends, the fluid conduit having a first end submerged at the bottom of the tank, and a second end positioned to impinge on the compost in the extraction basket, and supplying compressed air to the bottom portion of the conduit to force aqueous solution up the tube and into the extraction basket.

BRIEF DESCRIPTION OF THE DRAWING

The Figure is a schematic, cross-sectional illustration of one embodiment of the present invention.

DETAILED DESCRIPTION OF THE INVENTION

Figure 1:
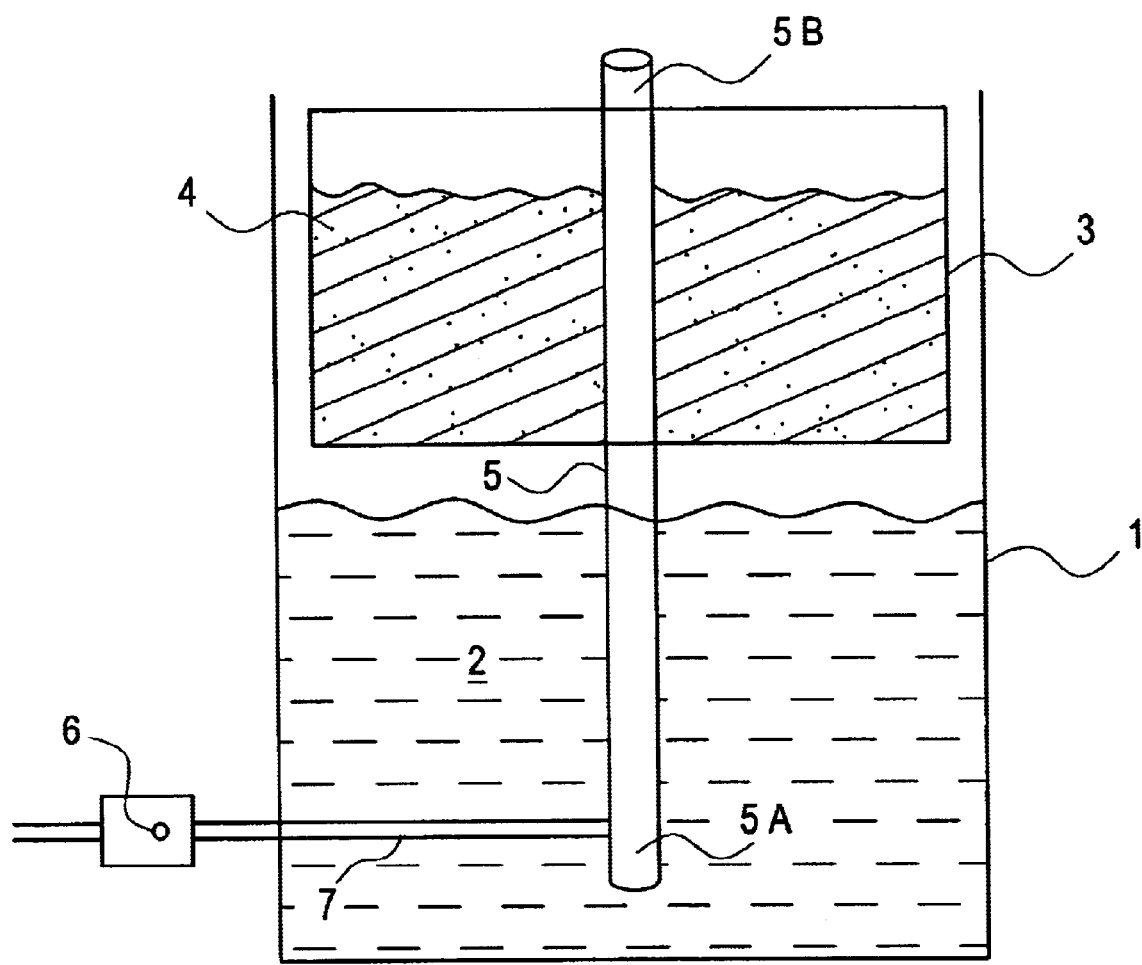

The present invention can be more fully understood by reference to the Figure, in which tank 1 contains water or aqueous solution 2. Extraction basket 3 is positioned above the tank. The basket contains compost 4. Fluid conduit 5 has first end 5A submerged at the bottom end of the tank, and a second end 5B positioned over the extraction basket. Compressed air supply 6 is operatively connected by connecting means 7 to the bottom portion of the conduit. The compressed air supply is preferably provided with a throttle, not shown. In operation of this apparatus, the compressed air forces the solution in the tank up through the conduit, circulating and aerating the solution, and empties it over the basket of compost, leaching the nutrients and microorganisms from the compost, forming or enriching a compost tea. The basket is positioned above the tank so that the enriched compost tea collects in the tank below.

The compost tea formed according to the present invention can be applied to plants and their soils to provide nutrients and desirable microorganisms. The present method and apparatus provides an air powered method of extracting compost tea from solid compost into a liquid, sprayable form. The method and apparatus of the present invention allows a grower to leach composted organic matter, extracting the nutrients and microbes that exist in the compost into a liquid solution. The circulation of the compost tea according to the present invention permits the microorganisms to be cultured and increase the beneficial microbes and their by-products. This solution can be injected into an irrigation system or sprayed on with a conventional sprayer.

The instant process and apparatus, using air to power circulation for extraction and culturing of the compost tea, provides the additional advantage of minimal mechanical damage to microbes in the solution.

The leached solution from the compost can be further enhanced by adding nutrients such as sugar to the culture tank solution, to increase the microbial population. The compost is the source of beneficial microbes and the present apparatus extracts, collects, and cultures compost tea. This tea contains and extracts the desired beneficial organisms and their by-products.

I claim:

1. An apparatus for producing compost tea comprising:

a tank of aqueous solution;

an extraction basket positioned over the tank to permit flow-through from this basket to be collected into the tank;

a fluid conduit having a first end submerged at the bottom end of the tank, and a second end positioned over the extraction basket; and a compressed air supply operatively connected to the bottom portion of the conduit to force the aqueous solution up through the conduit.

2. An apparatus of claim 1, wherein the compressed air supply further comprises a throttle means.

3. A method for producing compost tea comprising:

placing compost in an extraction basket;

positioning the extraction basket over a tank to permit flow through from the basket into the tank;

introducing an aqueous solution into the tank; positioning a fluid conduit having first and second ends, the fluid conduit having a first end submerged at the bottom of the tank, and a second end positioned to impinge on the compost in the extraction basket; and supplying compressed air to the bottom portion of the conduit to force aqueous solution up through the conduit and into the extraction basket.

4. A method of claim 3 further comprising adding nutrient to the aqueous solution.

5. A method of claim 4 wherein the nutrient comprises sugar.

* * * * *